US010968927B2

(12) United States Patent
Mujumdar et al.

(10) Patent No.: US 10,968,927 B2
(45) Date of Patent: Apr. 6, 2021

(54) HYDRAULIC VALVE ASSEMBLY WITH AUTOMATED TUNING

(71) Applicant: EATON INTELLIGENT POWER LIMITED, Dublin (IE)

(72) Inventors: Chaitanya Mujumdar, Pune (IN); Brandon Petersen, Woodbury, MN (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 26 days.

(21) Appl. No.: 16/369,116

(22) Filed: Mar. 29, 2019

(65) Prior Publication Data

US 2019/0301496 A1 Oct. 3, 2019

(30) Foreign Application Priority Data

Apr. 2, 2018 (IN) .............................. 201811012407

(51) Int. Cl.
| | |
|---|---|
| *F15B 21/02* | (2006.01) |
| *G05D 7/06* | (2006.01) |
| *F15B 13/04* | (2006.01) |
| *F15B 13/044* | (2006.01) |
| *F15B 11/04* | (2006.01) |
| *G05B 19/05* | (2006.01) |

(52) U.S. Cl.
CPC .............. *F15B 21/02* (2013.01); *F15B 11/04* (2013.01); *F15B 13/0402* (2013.01); *F15B 13/044* (2013.01); *G05B 19/05* (2013.01); *G05D 7/0688* (2013.01); *F15B 2211/426* (2013.01); *F15B 2211/6654* (2013.01); *F15B 2211/7051* (2013.01); *G05B 2219/1136* (2013.01); *G05B 2219/15053* (2013.01)

(58) Field of Classification Search
CPC ........ B62D 5/091; B62D 11/005; B62D 5/06; A01B 63/22; B60G 13/08; B60G 2202/412
See application file for complete search history.

(56) References Cited

U.S. PATENT DOCUMENTS

| | | | |
|---|---|---|---|
| 5,507,316 A * | 4/1996 | Meyer | F01L 9/02 123/90.12 |
| 5,666,806 A | 9/1997 | Dietz | |
| 5,880,957 A * | 3/1999 | Aardema | G05B 19/0426 700/86 |
| 6,490,491 B1 * | 12/2002 | Hartmann | F02D 41/2425 700/18 |
| 7,130,721 B2 | 10/2006 | Wear et al. | |
| 2006/0090459 A1 * | 5/2006 | Devier | F15B 11/162 60/422 |
| 2009/0084192 A1 * | 4/2009 | Budde | F15B 11/162 73/861.04 |

* cited by examiner

*Primary Examiner* — Kidest Bahta
(74) *Attorney, Agent, or Firm* — Merchant & Gould P.C.

(57) ABSTRACT

A hydraulic valve assembly includes an algorithm stored in an internal memory of the hydraulic valve assembly that determines a spool correction command based on a flow demand which is calculated for obtaining a target single port pressure or a target delta pressure using one or more port pressure measurements. The spool correction command is sent to an upper level controller of the hydraulic valve assembly, and the upper level controller uses the spool correction command to obtain an optimal displacement of a spool inside the valve assembly.

16 Claims, 8 Drawing Sheets

HYDRAULIC VALVE ASSEMBLY WITH AUTOMATED TUNING

CROSS-REFERENCE TO RELATED APPLICATIONS

This application claims priority to Indian Provisional Patent Application Number 201811012407 filed Apr. 2, 2018, the disclosure of which is incorporated herein by reference in its entirety.

BACKGROUND

Proportional-integral-derivative controllers ("PID controllers") are used to continuously monitor and control the performance of hydraulic valves by calculating an error value e(t) as a difference between a desired set point ("SP") and a measured process variable ("PV"). A PID controller attempts to minimize the error value e(t) over time by producing a control response that adjusts a control variable u(t) of the hydraulic valve such as the position, speed, and acceleration of the spool within the valve. Accordingly, PID controllers can be utilized to control the performance of a hydraulic valve to meet desired performance characteristics.

PID controllers must typically be tuned before they can be utilized for controlling the performance of a hydraulic valve. The tuning of a PID controller typically involves the adjustment of the control parameters (e.g., the proportional, integral, and derivative gains) to optimum values so that the PID controller produces accurate and consistent control responses.

PID controllers are often manually tuned which can be done by entering a process variable as an input, determining an error from a desired set point, measuring a control response as an output, and using the control response to adjust the control parameters of the controller. This process can be repeated for various process variables.

Manual tuning methods of PID controllers typically rely on trial and error. Moreover, since the starting values of the control parameters are often not known, a lot of time has to be spent to obtain good tuning to achieve desirable control tracking and speed of response.

Additionally, the tuning of PID controllers is complicated by the fact that single port and dual port delta pressure is a highly dynamic variable in hydraulic cylinders which makes its control challenging. Typically, PID controllers cannot efficiently control the pressure in hydraulic cylinders and do not have good control tracking and speed of response. The control becomes worse in case of varying load conditions and change in load speed and direction.

Thus, improvements are needed to reduce the time it takes to tune PID controllers while also improving the control tracking and speed of response of PID controllers.

SUMMARY

In general terms, the present disclosure is directed to a hydraulic valve assembly. In one possible configuration and by non-limiting example, the hydraulic valve assembly includes an algorithm stored in an internal memory of the valve assembly that determines a spool correction command based on a flow demand. The spool correction command is sent to an upper level controller of the valve assembly, which uses the spool correction command to obtain an optimal displacement of a spool inside the valve assembly.

In one aspect, the disclosed technology relates to a hydraulic valve assembly that includes a valve body housing a spool, the valve body defining a bore in which the spool is positioned, the valve body having one or more ports in fluid communication with the bore for connecting the valve body to an actuator, and a connector that connects the hydraulic valve to an external computing device. An upper level controller and a lower level controller are integrated with the hydraulic valve. The upper level controller includes at least one processing device, and at least one computer readable data storage device configured to receive user specified parameter inputs and raw command inputs. The at least one computer readable data storage device storing instructions, that when executed by the at least one processing device, cause the hydraulic valve to: convert the raw command inputs into shaped command inputs using a shaping algorithm; use the lower level controller to move the spool inside the valve body based on the shaped command input, and determine an error of the spool as a difference between target set points of the shaped command input and measurements of the actuator; determine a flow demand to obtain a target single port pressure or a target delta pressure of the shaped command input, the flow demand determined using port pressure measurements inside the valve body; use a valve database stored in the at least one computer readable data storage device to determine a spool correction command based on the determined flow demand; and send the spool correction command to the upper level controller to adjust the movement of the spool to reduce the determined error of the spool. In some examples, the flow demand is calculated to include bulk modulus compensation, cylinder volume compensation, and/or cylinder speed compensation. In some examples, the valve database includes a look up table that includes a plurality of spool correction commands associated with flow demands. In some examples, the upper level controller is a proportional-integral-derivative controller. In some examples, the lower level controller is a linear controller.

In another aspect, the disclosed technology relates to a method of tuning a hydraulic valve assembly, the hydraulic valve assembly including a valve body housing a spool, the valve body defining a bore in which the spool is positioned, and the valve body having one or more ports in fluid communication with the bore for connecting the valve body to an actuator, the method comprising: receiving parameter inputs; receiving a raw command input, and converting the raw command input into a shaped command input using a shaping algorithm; moving the spool inside the valve body based on the shaped command input, and determining an error of the spool as a difference between target set points of the shaped command input and measurements of the actuator; determining a flow demand for obtaining a target single port pressure or a target delta pressure of the shaped command input; using a valve database to determine a spool correction command based on the determined flow demand; and sending the spool correction command to an upper level controller of the hydraulic valve assembly to adjust the movement of the spool to reduce the determined error of the spool. In some examples, the parameter inputs include user specified parameter inputs, valve information parameter inputs, and measurement parameter inputs. In some examples, calculating the flow demand includes bulk modulus compensation, cylinder volume compensation, and/or cylinder speed compensation.

In another aspect, the disclosed technology relates to a method of tuning a hydraulic valve assembly, the method comprising: connecting an external computing device to the hydraulic vale assembly; entering one or more user specified parameter inputs into the external computing device; entering one or more raw command input into the external computing device; and disconnecting the external computing device, and using the hydraulic valve assembly to operate an actuator connected to the hydraulic valve assembly. In some examples, the external computing device is a computer running a configuration software application. In some examples, the external computing device is a programmable logic controller. In some examples, the actuator is a hydraulic cylinder.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Figure 1:
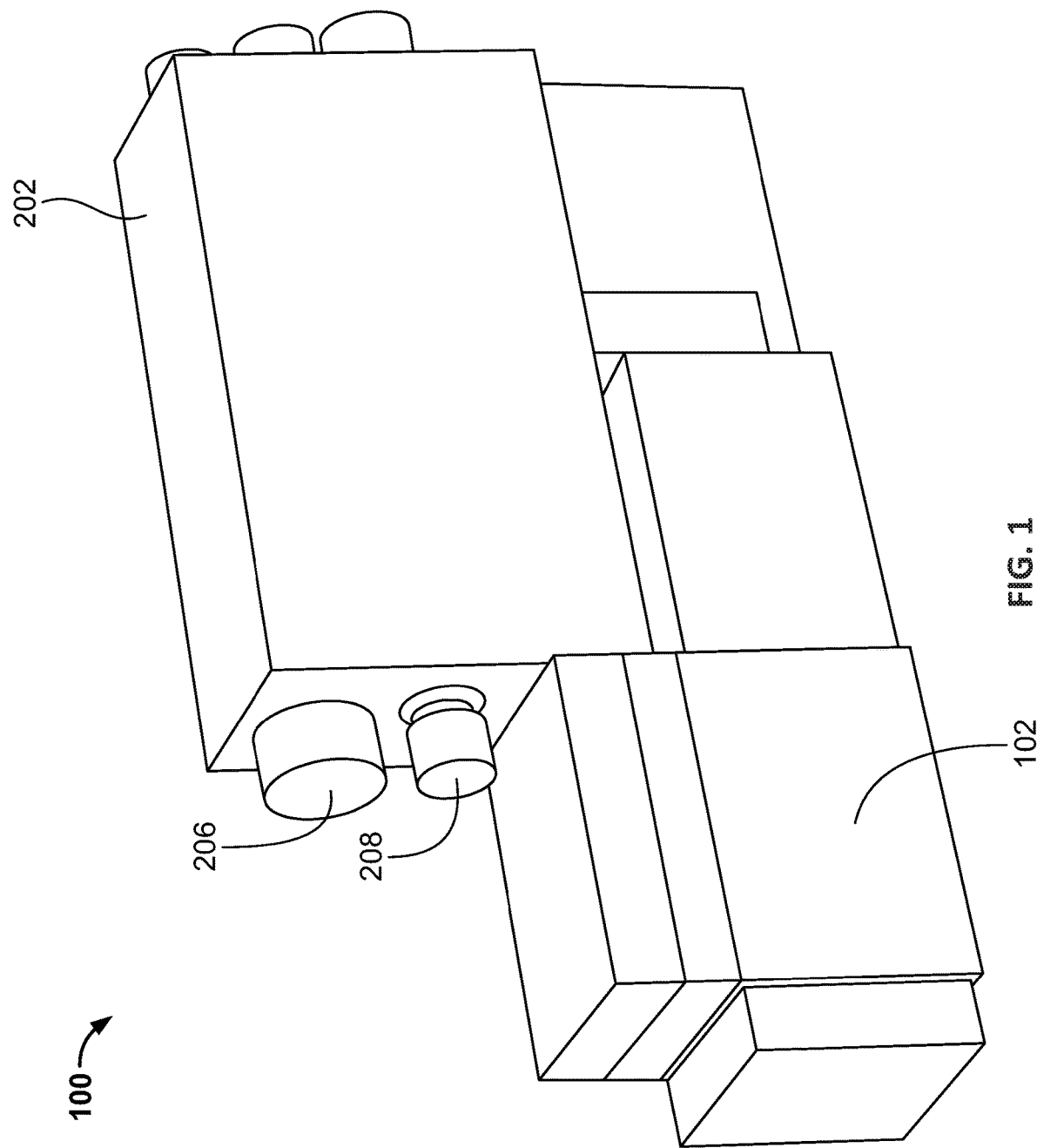
FIG. 1 illustrates an isometric view of an example hydraulic valve assembly.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 shows a perspective view of a valve assembly 100. The valve assembly 100 includes a valve module 102, and an electronics module 202 connected to the valve module 102. In certain examples, the valve module 102 is a single spool proportional b-directional valve. In other examples, the valve module 102 is a double stage valve with pilot and main stage spools.

Figure 2:
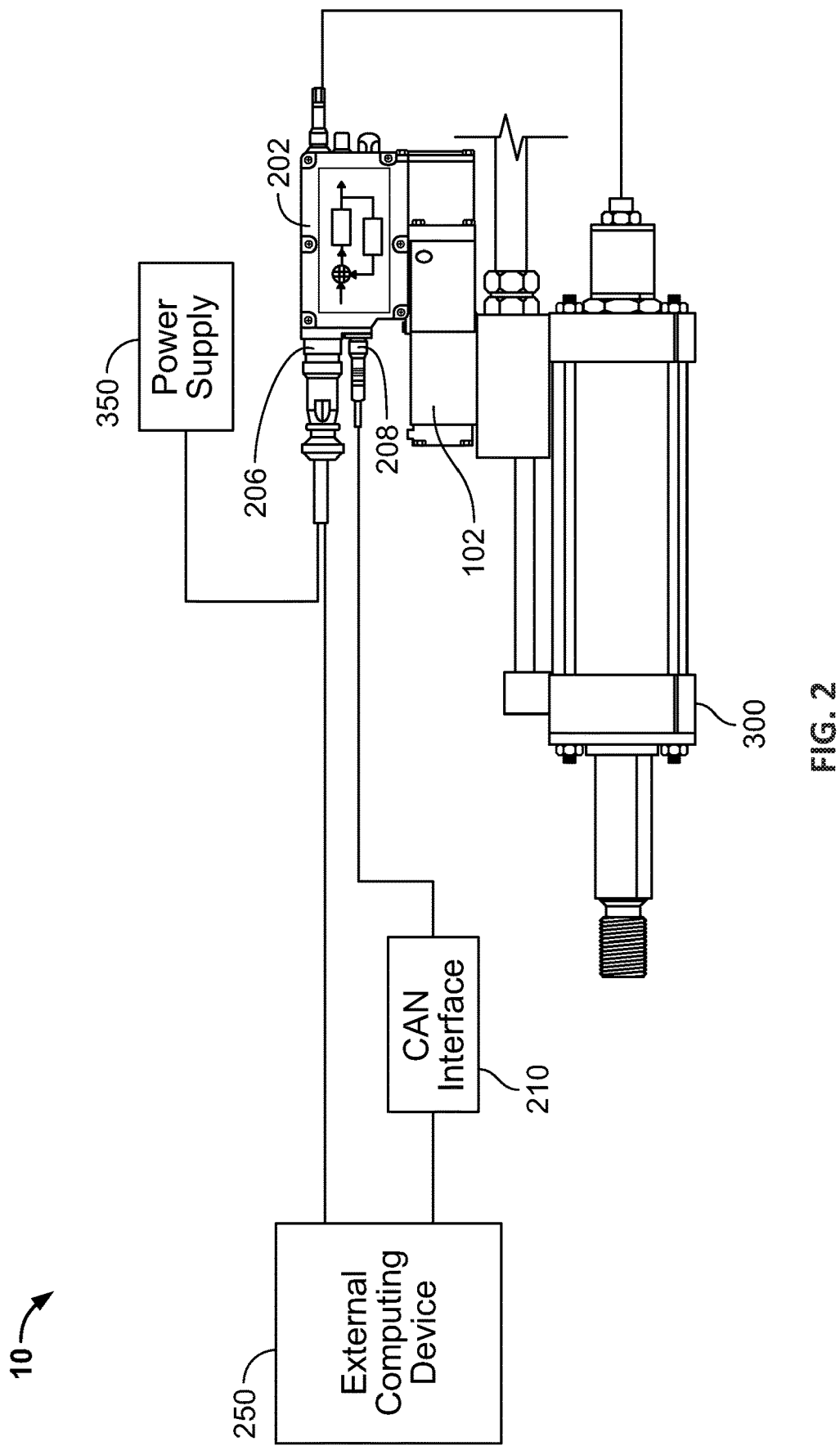
FIG. 2 illustrates a schematic diagram of an example hydraulic system.

FIG. 2 is a schematic diagram illustrating a hydraulic system 10 that includes the valve assembly 100 of FIG. 1. Referring now to FIGS. 1 and 2, the electronics module 202 communicates with the valve module 102 for controlling hydraulic fluid flow to a device 300. In certain examples, the device 300 is an actuator such as a hydraulic cylinder that is part of a hydraulic machine such as an injection molding machine, a rolling shear machine, and/or a concrete compressive/tensile strength measurement machine.

The electronics module 202 includes a first connector 206. The first connector 206 may be used connect the valve assembly 100 to a power supply 350. In some examples, the power supply 350 is a 24V DC power supply for powering the valve assembly 100. In some examples, the power from the power supply 350 is conditioned by a converter to have a correct voltage before reaching the electronics module 202 of the valve assembly 100.

The electronics module 202 includes a second connector 208. The second connector 208 may be used connect the valve assembly 100 to an external computing device 250 that may be used to set up and tune a controller of the valve assembly 100. In certain examples, the external computing device 250 is a programmable logic controller (PLC) or a personal computer such as a laptop computer. In certain examples, the second connector 208 connects the valve assembly 100 to the external computing device 250 via a CAN interface 210. In certain examples, a CAN connection or other similar type of connection may be used to connect the external computing device 250 to the CAN interface 210 of the electronics module 202.

Figure 3:
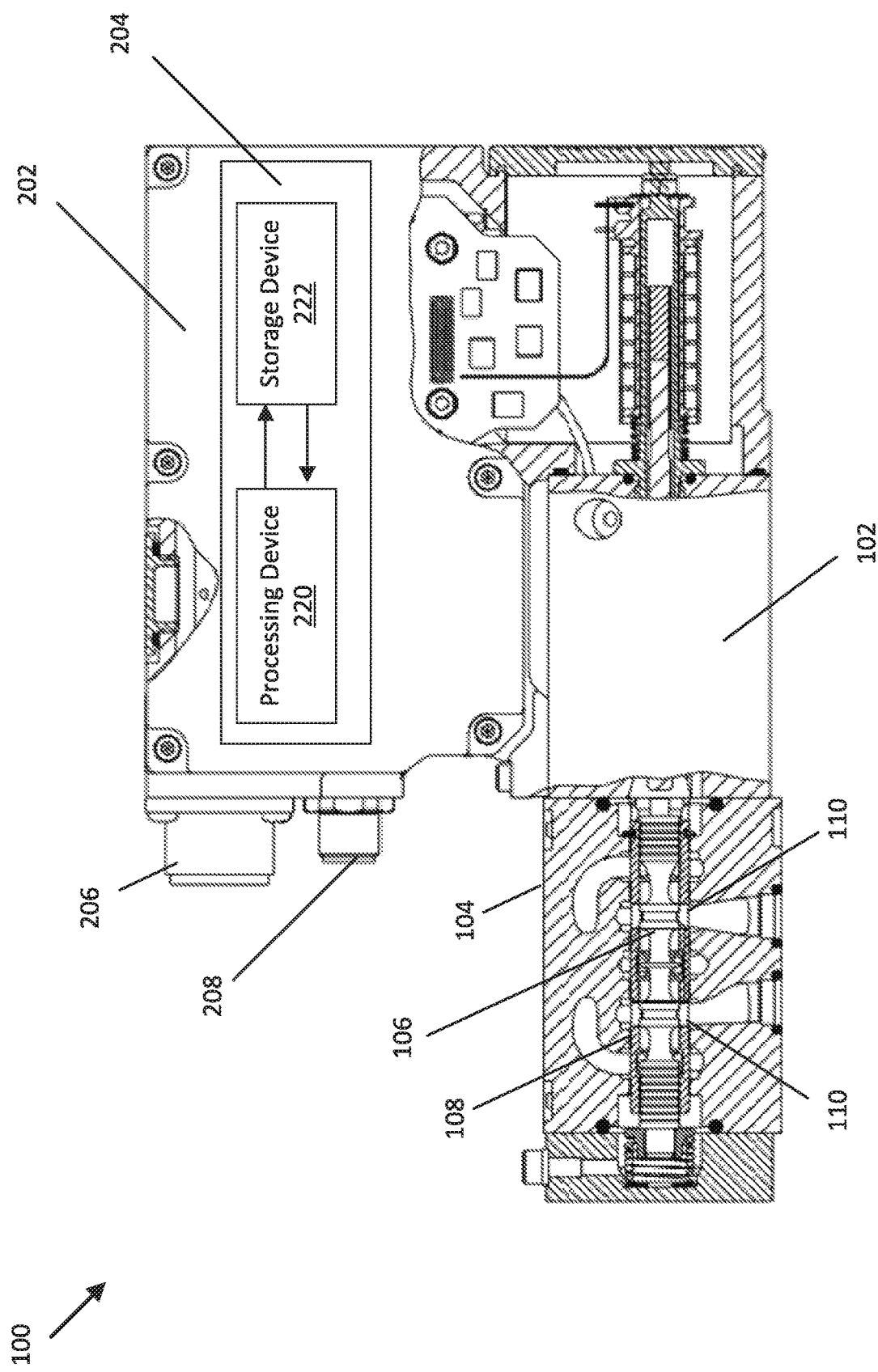
FIG. 3 illustrates a cross-sectional side view of an example hydraulic valve assembly.

Referring now to FIG. 3 which shows a cross-sectional view of the valve assembly 100, the valve module 102 includes a valve body 104. The valve body 104 houses a spool 106 positioned inside a bore 108. The bore 108 includes one or more ports 110 for connecting the valve body 104 to certain hydraulic system components such as the hydraulic cylinder 300 depicted in FIG. 2. Solenoids may be positioned on either side of the spool 106 for moving the spool 106 inside the valve body 104. Movement of the spool 106 inside the valve body 104 controls the fluid flow inside the valve module 102 for moving the hydraulic cylinder 300.

The electronics module 202 includes a controller 204 to continuously monitor and control the performance of the valve assembly 100. In certain examples, the electronics housing may utilize various sensors to measure the position of the spool 106 inside the valve body 104 as well as a single port pressure or a dual port delta pressure of the valve body 104. In certain examples, the controller 204 is a proportional-integral-derivative (PID) controller.

The controller 204 includes a processing device 220 and a computer readable data storage device 222. In some examples, the controller 204 is a microcontroller. In some examples, the processing device 220 includes one or more central processing units (CPUs). The computer readable data storage device 222 may include volatile and nonvolatile, removable and non-removable media configured to store information such as computer readable instructions, data structures, program modules, or other data that can be accessed by the processing device 220.

The controller 204 receives inputs from the second connector 208. The inputs are received by an input circuit which relays the inputs to the controller 204. The controller 204 processes and sends the inputs to an output circuit configured to actuate the solenoids inside the valve body 104 for moving the spool 106. The controller 204 can be connected to one or more sensors that can be used to measure the position of the spool 106, as well as a single port pressure or a dual port delta pressure of the valve body 104. The one or more sensors are connected to a feedback circuit configured to relay measurements to the controller 204.

Figure 4:
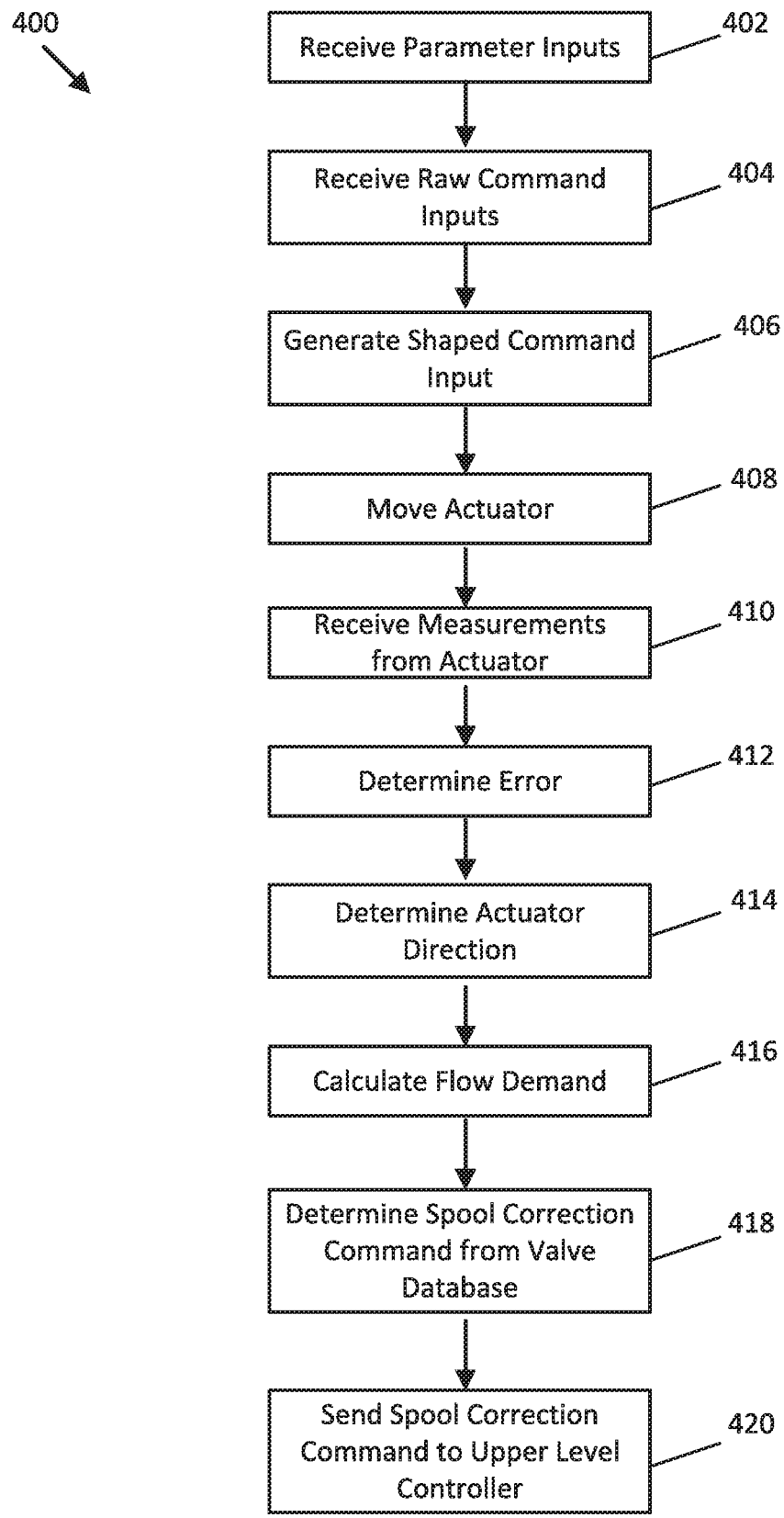
FIG. 4 illustrates a method of tuning a controller of a hydraulic valve assembly.
Figure 5:
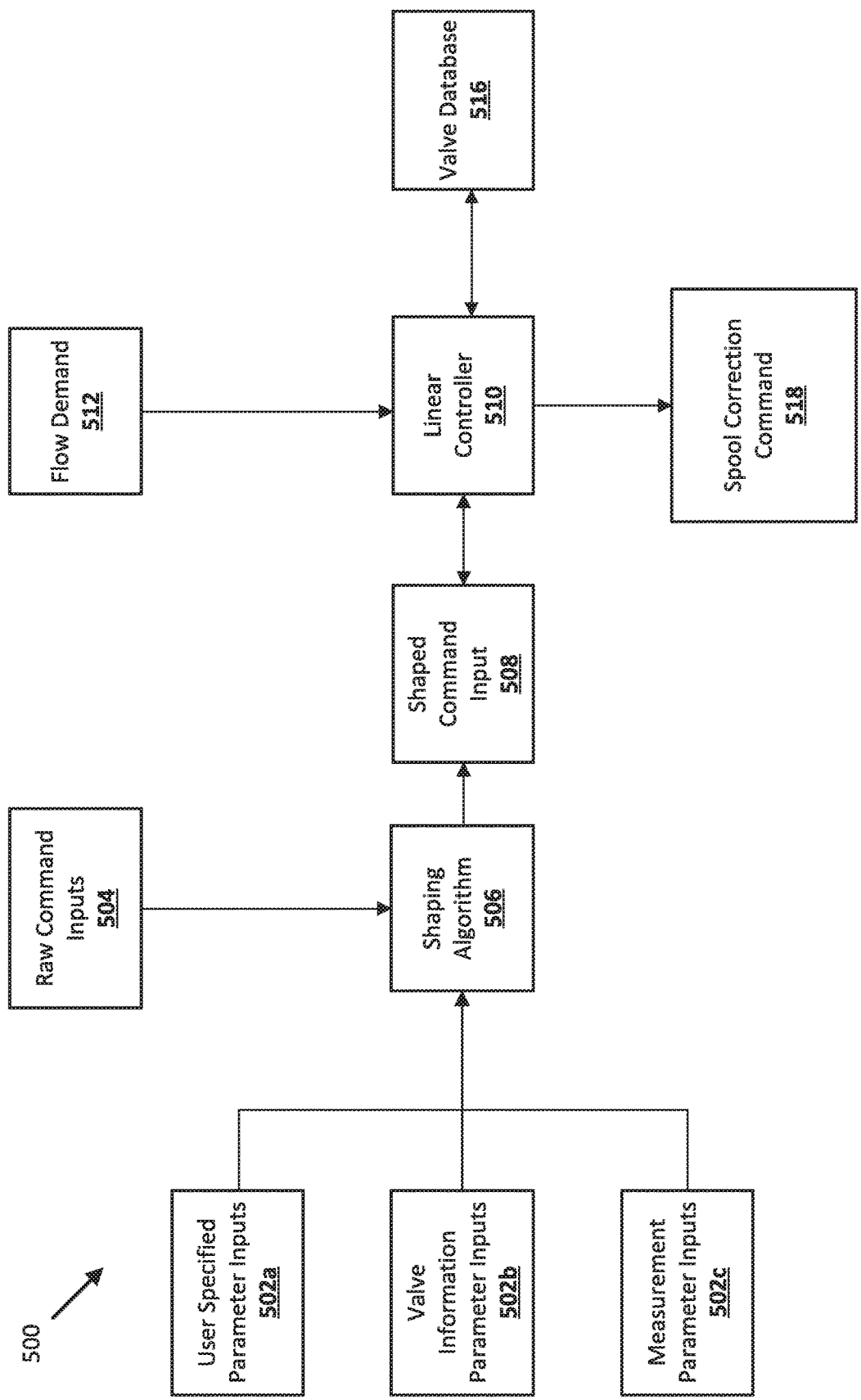
FIG. 5 illustrates a schematic diagram of an algorithm for tuning a controller of a hydraulic valve assembly.

FIG. 4 illustrates a method 400 for tuning the controller 204 of the valve assembly 100. FIG. 5 is a schematic diagram of an algorithm 500 for tuning the controller 204. The algorithm 500 is stored on the computer readable data storage device 222 of the controller 204.

Referring now to FIGS. 4 and 5, the method 400 includes a first step 402 of receiving various parameter inputs 502. The parameter inputs 502 may include user specified parameter inputs 502a including, but not limited to, a maximum acceleration, a maximum deceleration, a maximum an extendible velocity, a maximum retractable velocity, a "K value", etc. for an actuator, such as the hydraulic cylinder 300, connected to the valve assembly 100. The user specified parameter inputs 502a may also include a rate of change limit.

In regards to the "K value", this value represents a rate of decay as an actuator approaches a set or target point. For example, when an actuator approaches a set point, the actuator starts to decelerate, and then at a predetermined threshold, the movement of the actuator goes into an exponential decay that ensures smooth behavior of the actuator. The K value is the exponential decay of the actuator measured in radians/second. In the case of a hydraulic cylinder, the user specified parameters 502a may also include piston area, stroke length, static conveyance volumes, cylinder orientation, plumbing, and pressure demand limits and their rate limits.

The user specified parameter inputs 502a are received from an external computing device, such as the external computing device 250 depicted in FIG. 2. In certain examples, the external computing device is a personal computer, such as a laptop or desktop computer, that runs a software configuration application. The computer running the software configuration application can be connected to the valve assembly 100 via the second connector 208. In other examples, the external computing device is programmable logic controller (PLC) connected to the valve assembly via the CAN interface 210 and an Ethernet or similar type of connection.

In addition to the user specified parameters 502a, the algorithm 500 may also receive valve information parameter inputs 502b such as valve size, spool type, and whether the valve is single port or dual port valve. The algorithm 500 may also receive measurement parameter inputs 502c such as port pressures inside the valve module 102, and the position of an actuator.

Next, the method 400 includes a step 404 of receiving a raw command input 504 from the configuration application run on the computer or the programmable logic controller (PLC) connected to the valve assembly via the CAN interface 210.

Thereafter the method 400 includes a step 406 of using a shaping algorithm 506 to convert the raw command input 504 into a shaped command input 508. The shaped command input 508 is a command input that the valve assembly 100 can follow. For example, the valve assembly 100 may sometimes be unable to perform a raw command input 504 due to certain constraints of the valve assembly and/or the actuator connected to the valve assembly.

The shaping algorithm 506 uses the parameter inputs received in step 402 to convert the raw command input 504 into a shaped command input 508. The shaping algorithm 506 uses the user specified parameters 502a so that the shaped command input 508 adheres to a maximum acceleration, maximum deceleration, maximum extendible velocity, maximum retractable velocity, K value, etc. The shaped command input 508 includes one or more target set points which are performance values for the actuator when activated by the valve assembly 100.

Thereafter, the method 400 includes a step 408 of using a linear controller 510 to move the actuator, such as the hydraulic cylinder 300, that is connected to the valve assembly 100. The movement of the actuator is based on the shaped command input 508 from step 406. In certain examples, the linear controller 510 is a module within the controller 204. In certain examples, the controller 204 is an upper level controller and the linear controller 510 is a lower level controller.

The method 400 next includes a step 410 of receiving one or more measurements of the actuator, such as the hydraulic cylinder 300, during performance of the shaped command input 508. For example, the method 400 may receive measurements such as the position, acceleration, deceleration, extendible velocity, retractable velocity, and K value of the actuator during performance of the shaped command input 508. In certain examples, these measurements are received from one or more sensors included in the valve assembly 100. In some examples, at least some of the measurements are estimated from the inputs received in step 402.

The method 400 next includes a step 412 of using the linear controller 510 to determine an error. The error is calculated as a difference between the target set points of the shaped command input 508 and the measurements of the actuator received in step 410.

The method 400 includes a step 414 of determining a direction of the movement of the actuator. For example, in the case of a hydraulic cylinder, the direction of the axial movement of the cylinder is determined. The direction of the actuator is determined so that a flow demand 512 (determined in the following step 416) is determined in a correct direction.

Next, the method 400 includes a step 416 of calculating the flow demand 512. The flow demand 512 is based on obtaining a target single port pressure in a set amount of time for a single port valve, or a target delta pressure in a set amount of time for a dual port valve.

The flow demand 512 can be calculated using the current port pressures 514 in the valve body 104. In certain examples, sensors are used to measure the current port pressures 514. In other examples, the current port pressures 514 are estimated by determining the flow characteristics of the valve assembly 100 based on the inputs 502 received in step 402. For example, inputs such as the size and type of spool housed inside the valve body 104 and the user specified parameter inputs 502a for the actuator connected to the valve assembly may be used to estimate the current port pressures 514 inside the valve body 104 of the valve assembly 100.

In certain examples, the calculation of the flow demand 512 includes bulk modulus compensation. The bulk modulus of a fluid is a measure of how resistant the fluid is to compressibility. In the case of a hydraulic cylinder, the bulk modulus of the fluid inside the cylinder changes as the pressure inside the cylinder changes. The algorithm 500 may receive pressure feedback inside the cylinder to compensate the flow demand 512.

In certain examples, the calculation of the flow demand 512 includes volume compensation. In the case of a hydraulic cylinder, pressure is affected by changes in the volume inside the cylinder as the cylinder moves continuously. The algorithm 500 may receive cylinder position feedback for computing a volume inside the hydraulic cylinder, and the algorithm 500 may use the computed volume to compensate the flow demand 512.

In certain examples, the calculation of the flow demand 512 includes speed compensation. In the case of a hydraulic cylinder, the pressure inside the cylinder is also affected by varying the speed of the cylinder. The algorithm 500 may receive an estimated cylinder speed from position feedback sensors in the cylinder, and the algorithm 500 may use the estimated cylinder speed to compensate the flow demand 512 for flow consumed by the cylinder.

Next, the method 400 includes a step 418 of using a valve database 516 to determine a spool correction command 518 based on the calculated flow demand 512. The spool correction command 518 is an optimal control parameter that includes optimal proportional, integral, and derivative gains. The spool correction command 518 reduces or eliminates the error determined in step 412. The valve database 516 is stored in the computer readable data storage device 222 of the controller 204. In some examples, the valve database 516 includes a look up table for determining the spool correction command 518 using the calculated flow demand 512.

The method 400 next includes a step 420 of sending the spool correction command 518 to the controller 204. In certain examples, the spool correction command 518 is stored in the computer readable data storage device 222 of the controller 204. As described above, the controller 204 may be considered an upper level controller, and the linear controller 510 used by the algorithm 500 may be considered a lower level controller.

The controller 204, which has faster processing speeds than the linear controller 510, uses the spool correction command 518 to adjust the movement of the spool 106 to reduce the determined error of the spool. For example, the controller uses the spool correction command 518 to operate the one or more solenoids adjacent to the spool 106 to obtain correct displacement of the spool 106 inside the valve assembly 100. The spool correction command 518 allows the controller 204 to generate accurate and consistent control responses during operation of the valve assembly 100 based on flow demand and pressure differential across the valve orifices.

The method 400 may automatically repeat steps 404-420 for each raw command input 504 entered via the configuration application run on the computer or the programmable logic controller (PLC) connected to the valve assembly by the CAN interface 210. The steps 404-420 may be repeated as needed or desired for tuning the controller 204.

The algorithm 500 simplifies the tuning of the controller 204 by reducing manual intervention because the controller 204 is tuned without having to manually adjust the PID gains of the controller for each raw command input. Instead, the valve database 516 is able to automatically determine accurate spool correction commands 518 when given a specific current port pressure 514 and given a specific flow demand 512. Thus, the algorithm 500 significantly reduces the time needed for tuning the controller 214 of the valve assembly 100. For example, traditional PID tuning may take approximately 2 to 3 days to complete, whereas the algorithm 500 reduces the tuning time for the controller 204 from about 20 minutes to about 30 minutes.

Figure 6:
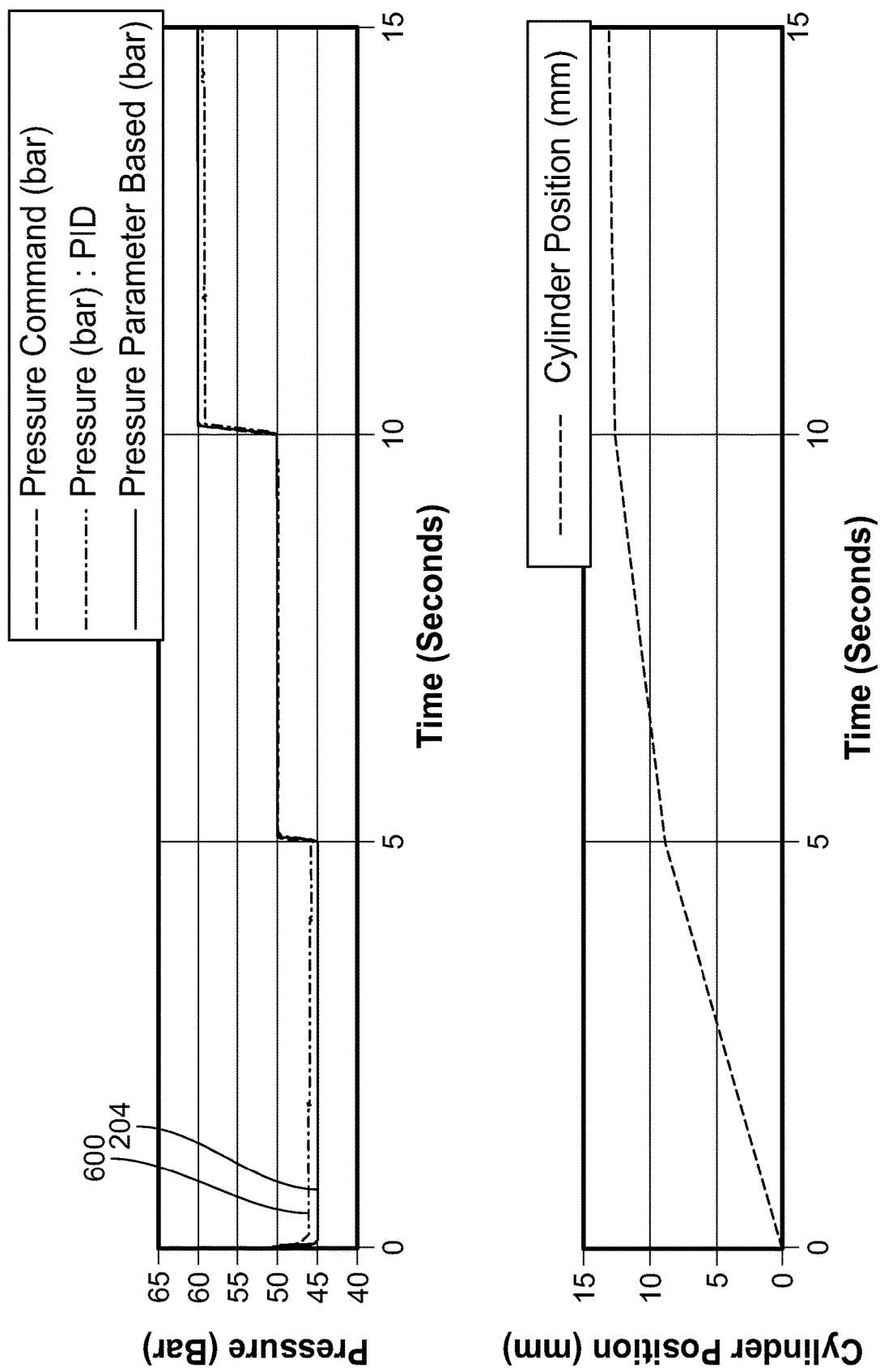
FIG. 6 illustrates a step tracking performance comparison between a traditional PID controller, and a controller in accordance with certain examples of the present disclosure.

FIG. 6 shows a step tracking performance comparison between a manually tuned PID controller 600, and the controller 204 tuned by the algorithm 500. In the example depicted in FIG. 6, a pressure command of 45 Bar moves the cylinder position in a time interval between 0 and 5 seconds, a pressure command of 50 Bar moves the cylinder position in a time interval between 5 and 10 seconds, and a pressure command of 60 Bar moves the cylinder position in a time interval between 10 and 15 seconds. The controller 204 is an improvement over the manually tuned PID controller 600 because it more accurately tracks the 45 Bar pressure command between the 0 and 5 seconds interval, the 50 Bar pressure command between the 5 and 10 seconds interval, and the 60 Bar pressure command between the 10 and 15 seconds interval.

Figure 7:
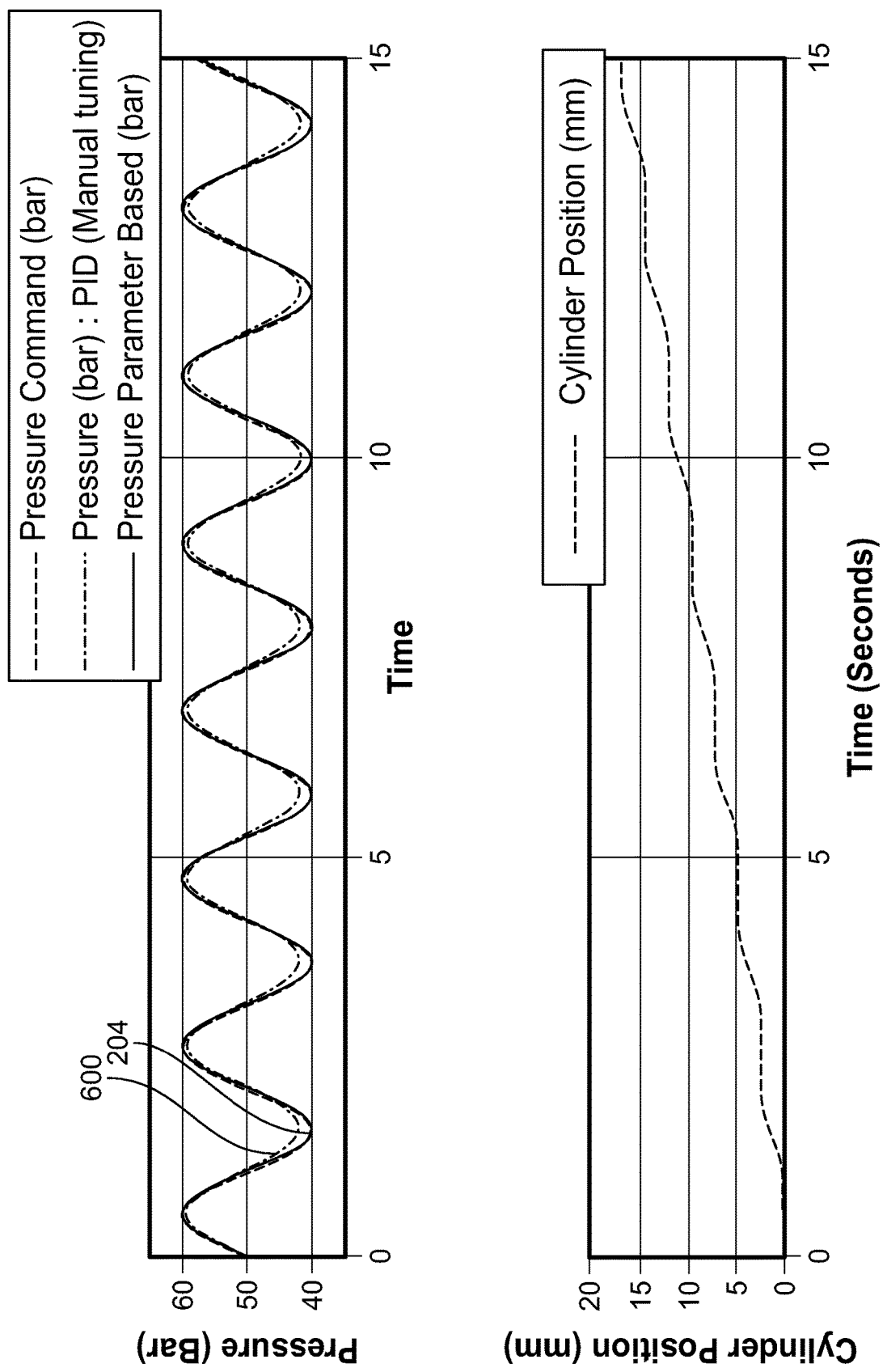
FIG. 7 illustrates a sine wave tracking performance comparison between a traditional PID controller, and a controller in accordance with certain examples of the present disclosure.

FIG. 7 illustrates a sine wave tracking performance comparison between the manually tuned PID controller 600 and the controller 204. As shown in FIG. 7, the performance of the controller 204 tuned with the algorithm 500 is better in set point tracking than the manually tuned PID controller 600 because the controller 204 more accurately tracks the oscillating 40 Bar and 60 Bar pressure commands in the time interval between 0 and 15 seconds.

The performance of the controller 204 is improved by the algorithm 500 in terms of responsiveness to pressure commands when compared to manually tuned PID controllers because the algorithm 500 compensates for changes in the bulk modulus of the cylinder fluid, changes in the volume of the cylinder fluid, and the cylinder speed. These variables are not compensated by manually tuned PID controllers. Also, the algorithm 500 can estimate force control from the port pressures without a force sensor, and the algorithm 500 detects overrunning or passive loading conditions internally, and accordingly the algorithm 500 can control flow to obtain a target force. Moreover, the algorithm 500 is able to handle smooth transition and operation of a single spool actuator at least because of the automatic adjustment of the gains and feedback of the controller 204.

Figure 8:
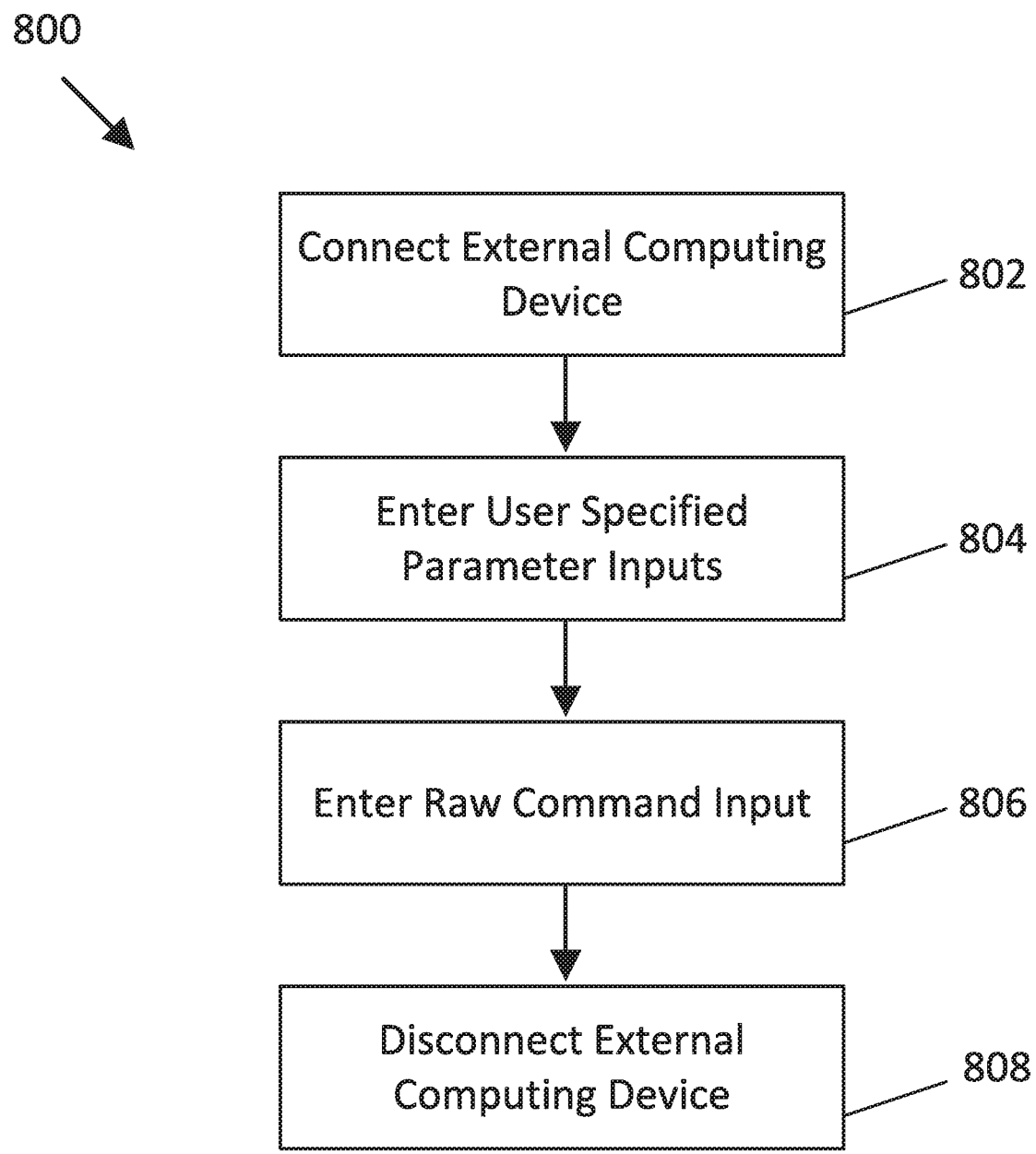
FIG. 8 illustrates a method of tuning a hydraulic valve assembly.

Referring now to FIG. 8 which shows a method 800 of tuning a hydraulic valve assembly connected to an actuator, such as the valve assembly 100 connected to the hydraulic cylinder 300 depicted in FIG. 2. The method 800 includes a first step 802 of connecting an external computing device the valve assembly 100. In certain examples, the external computing device is a personal computer, such as a laptop or desktop computer, that runs a software configuration application. In other examples, the external computing device is programmable logic controller (PLC).

Next, the method 800 includes a step 804 of entering one or more user specified parameter inputs into the external computing device. For example, the one or more user specified parameter inputs may be entered into the configuration application run on the computer, or may be entered into the programmable logic controller (PLC) connected to the hydraulic valve assembly via the CAN interface 210. The one or more user specified parameter inputs may include, but are not limited to, a maximum acceleration, a maximum deceleration, a maximum an extendible velocity, a maximum retractable velocity, a "K value", etc.

Next, the method 800 includes a step 806 of entering a raw command input into the external computing device. For example, the raw command input may be entered into the configuration application run on the computer, or entered into the programmable logic controller connected to the valve assembly via the CAN interface 210. The step 806 may be repeated for entering multiple raw command inputs as may be needed or desired for a particular application.

Thereafter, the method 800 includes a step 808 of disconnecting the external computing device from the valve assembly. After step 808, the valve assembly is tuned and ready to be used for operating the actuator connected thereto. In certain examples, the actuator is a hydraulic cylinder that is part of a hydraulic machine such as an injection molding machine, a rolling shear machine, and/or a concrete compressive/tensile strength measurement machine.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A hydraulic valve assembly comprising:
   a valve body housing a spool, the valve body defining a bore in which the spool is positioned, the valve body having one or more ports in fluid communication with the bore for connecting the valve body to an actuator;
   a connector to connect the hydraulic valve to an external computing device; and
   an upper level controller and a lower level controller integrated with the hydraulic valve, the upper level controller including at least one processing device, and at least one computer readable data storage device configured to receive user specified parameter inputs and raw command inputs, the at least one computer readable data storage device storing instructions, when executed by the at least one processing device, cause the hydraulic valve to:
      convert the raw command inputs into shaped command inputs using a shaping algorithm;
      use the lower level controller to move the spool inside the valve body based on the shaped command input, and determine an error of the spool as a difference between target set points of the shaped command input and measurements of the actuator;
      determine a flow demand to obtain a target single port pressure or a target delta pressure based on the target set points of the shaped command input, the flow demand determined using port pressure measurements inside the valve body;
      use a valve database stored in the at least one computer readable data storage device to determine a spool correction command based on the determined flow demand; and
      send the spool correction command to the upper level controller to adjust the movement of the spool to reduce the determined error of the spool.

2. The hydraulic valve assembly of claim 1, wherein the flow demand is calculated to include bulk modulus compensation.

3. The hydraulic valve assembly of claim 1, wherein the flow demand is calculated to include cylinder volume compensation.

4. The hydraulic valve assembly of claim 1, wherein the flow demand is calculated to include cylinder speed compensation.

5. The hydraulic valve assembly of claim 1, wherein the valve database includes a look up table that includes a plurality of spool correction commands associated with flow demands.

6. The hydraulic valve assembly of claim 1, wherein the upper level controller is a proportional-integral-derivative controller.

7. The hydraulic valve assembly of claim 1, wherein the lower level controller is a linear controller.

8. A method of tuning a hydraulic valve assembly, the hydraulic valve assembly including a valve body housing a spool, the valve body defining a bore in which the spool is positioned, and the valve body having one or more ports in fluid communication with the bore for connecting the valve body to an actuator, the method comprising:
   receiving parameter inputs;
   receiving a raw command input, and converting the raw command input into a shaped command input using a shaping algorithm;
   moving the spool inside the valve body based on the shaped command input, and determining an error of the spool as a difference between target set points of the shaped command input and measurements of the actuator;
   determining a flow demand for obtaining a target single port pressure or a target delta pressure of the shaped command input;
   using a valve database to determine a spool correction command based on the determined flow demand; and
   sending the spool correction command to an upper level controller of the hydraulic valve assembly to adjust the movement of the spool to reduce the determined error of the spool.

9. The method of claim 8, wherein the parameter inputs include user specified parameter inputs, valve information parameter inputs, and measurement parameter inputs.

10. The method of claim 8, wherein calculating the flow demand includes bulk modulus compensation.

11. The method of claim 8, wherein calculating the flow demand includes cylinder volume compensation.

12. The method of claim 8, wherein calculating the flow demand includes cylinder speed compensation.

13. A method of tuning a hydraulic valve assembly, the method comprising:
   connecting an external computing device to the hydraulic valve assembly, the hydraulic valve assembly including a valve body having a spool positioned inside a bore, and one or more ports for communicating fluid from the bore to an actuator, the hydraulic valve assembly further including a controller;
   entering one or more user specified parameter inputs into the external computing device;
   entering one or more raw command inputs into the external computing device;
   using the controller of the hydraulic valve assembly to:
      move the spool inside the valve body based on the raw command inputs, and determine an error of the spool as a difference between target set points of the raw command inputs and measurements of the actuator;
      determine a flow demand to obtain a target pressure for the target set points based on the raw command inputs, the flow demand determined using port pressure measurements inside the valve body; and
      automatically determine a spool correction command to reduce the error based on the determined flow demand using a valve database; and
   disconnecting the external computing device, and using the hydraulic valve assembly to operate an actuator connected to the hydraulic valve assembly.

14. The method of claim 13, wherein the external computing device is a computer running a configuration software application.

15. The method of claim 13, wherein the external computing device is a programmable logic controller.

16. The method of claim 13, wherein the actuator is a hydraulic cylinder.

* * * * *